(12) United States Patent
Hutchison et al.

(10) Patent No.: US 7,953,401 B2
(45) Date of Patent: May 31, 2011

(54) METHODS AND APPARATUS FOR OUT OF SERVICE PROCESSING WITH VARIED BEHAVIORS

(75) Inventors: James A. Hutchison, San Diego, CA (US); Parag Mohan Kanade, San Diego, CA (US); Bhupesh Manoharlal Umatt, Poway, CA (US); Alex Kuang-Hsuan Tu, San Diego, CA (US); Messay Amerga, San Diego, CA (US); Vineet Mittal, San Diego, CA (US); Michael Kevin Spartz, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 12/054,135

(22) Filed: Mar. 24, 2008

(65) Prior Publication Data

US 2008/0280610 A1    Nov. 13, 2008

Related U.S. Application Data

(60) Provisional application No. 60/908,036, filed on Mar. 26, 2007.

(51) Int. Cl.
*H04M 3/00* (2006.01)
(52) U.S. Cl. .................................. 455/418; 455/414.1
(58) Field of Classification Search .................. None
See application file for complete search history.

(56) References Cited

U.S. PATENT DOCUMENTS

| | | | |
|---|---|---|---|
| 7,472,412 B2* | 12/2008 | Wolf et al. | 726/6 |
| 2001/0007560 A1* | 7/2001 | Masuda et al. | 370/401 |

FOREIGN PATENT DOCUMENTS

| | | |
|---|---|---|
| WO | 2006076794 | 7/2006 |
| WO | 2007009928 | 1/2007 |

OTHER PUBLICATIONS

Schneider, M.L.: "Weighted Decision Tables—An Alternative Solution for Ambiguity," The Computer Journal vol. 28, No. 4, XP-002496230, pp. 366-371, Aug. 1985.
International Search Report—PCT/US2008/058330, International Searching Authority—European Patent Office—Sep. 30, 2008.
Written Opinion—PCT/US2008/058330, International Searching Authority—European Patent Office—Sep. 30, 2008.

* cited by examiner

*Primary Examiner* — Ajit Patel
(74) *Attorney, Agent, or Firm* — Kristine U. Ekwueme

(57) ABSTRACT

Methods and apparatus for out of service processing with varied behaviors. In an aspect, a method is provided for service acquisition. The method includes determining one or more conditions, wherein each condition is associated with at least one weight, detecting whether an out-of-service event has occurred, and if an out-of-service event is detected: identifying selected conditions and associated weights, and processing the associated weights to determine service acquisition "on" and "off" times. In an aspect, an apparatus includes condition logic configured to determine one or more conditions, wherein each condition is associated with at least one weight, and processing logic configured to detect whether an out-of-service event has occurred, and if an out-of-service event is detected, to identify selected conditions and associated weights, and process the associated weights to determine service acquisition "on" and "off" times.

45 Claims, 5 Drawing Sheets

| | | | |
|---|---|---|---|
| $C_1$ | Heavy user | $Weight_1$ | $Flag_1$ |
| | -- | | |
| | -- | | |
| | -- | | |
| $C_i$ | Device type | $Weight_i$ | $Flag_i$ |
| $C_{i+1}$ | USA operation | $Weight_{i+1}$ | $Flag_{i+1}$ |
| $C_{i+2}$ | Position | $Weight_{i+2}$ | $Flag_{i+2}$ |
| $C_{i+3}$ | Battery Life | $Weight_{i+3}$ | $Flag_{i+3}$ |
| $C_j$ | Recent acquisition success | $Weight_j$ | $Flag_j$ |
| $C_{j+1}$ | Number of operating bands | $Weight_{j+1}$ | $Flag_{j+1}$ |
| $C_{j+2}$ | SNR | $Weight_{j+2}$ | $Flag_{j+2}$ |
| $C_n$ | | | |

FIG. 4

| Mode 1 | Power up | Condition List (1) |
|---|---|---|
| Mode 2 | Default | $\{C_1, C_2, C_3 \ldots C_n\}$ |
| Mode 3 | $OOS_1$ | Condition List (3) |
| ⋮ | | |
| Mode n | $OOS_n$ | Condition List (n) |

FIG. 5

METHODS AND APPARATUS FOR OUT OF SERVICE PROCESSING WITH VARIED BEHAVIORS

CLAIM OF PRIORITY UNDER 35 U.S.C. §119

The present Application for Patent claims priority to Provisional Application No. 60/908,036 entitled "Uniform Out-of-Service with Varied Behaviors" filed Mar. 26, 2007, and assigned to the assignee hereof and hereby expressly incorporated by reference herein.

BACKGROUND

1. Field

The present application relates generally to the operation of wireless communication devices, and more particularly, to methods and apparatus for out-of-service processing with varied behaviors.

2. Background

When a wireless communication device is not able to receive a usable signal from a serving system it is said to be out-of-service (OOS). The wireless communication device attempts to acquire a usable signal so that service with the serving system can be established. In its attempts to acquire a usable signal, the wireless communication device expends battery power attempting to acquire usable signals that are not readily available, which reduces the wireless communication device's available operating time before the battery needs recharging. For example, if the wireless communication device continuously attempts to acquire a usable signal, and such a signal is not readily available in the wireless communication device's current operating environment, the battery power will quickly be consumed with no beneficial result.

Therefore, what is needed is a mechanism that operates to provide out-of-service processing at a wireless communication device that allows the wireless communication device to efficiently acquire a usable signal to establish service based on conditions that are known when loss of service is detected.

SUMMARY

In one or more aspects, a service acquisition system, comprising methods and apparatus, is provided that operates to control how a wireless communication device attempts to acquire service after an out-of-service state is detected. The acquisition system takes into consideration conditions that are known by the wireless communication device when the out-of-service state is detected to determine how to pursue service acquisition. Thus, based on the conditions at the wireless communication device, the system can vary the behavior of the wireless communication device to attempt service acquisition more or less aggressively thereby controlling battery power utilization.

In an aspect, a method is provided for service acquisition. The method comprises determining one or more conditions, wherein each condition is associated with at least one weight, detecting whether an out-of-service event has occurred, and if an out-of-service event is detected: identifying selected conditions and associated weights, and processing the associated weights to determine service acquisition "on" and "off" times.

In an aspect, an apparatus is provided for service acquisition. The apparatus comprises condition logic configured to determine one or more conditions, wherein each condition is associated with at least one weight, and processing logic configured to detect whether an out-of-service event has occurred, and if an out-of-service event is detected, to identify selected conditions and associated weights, and process the associated weights to determine service acquisition "on" and "off" times.

In an aspect, an apparatus is provided for service acquisition. The apparatus comprises means for determining one or more conditions, wherein each condition is associated with at least one weight. The apparatus also comprises means for detecting whether an out-of-service event has occurred, and if an out-of-service event is detected: means for identifying selected conditions and associated weights, and means for processing the associated weights to determine service acquisition "on" and "off" times.

In an aspect, a computer program product is provided for service acquisition. The computer program product comprises a machine-readable medium that comprises a first set of codes for causing a computer to determine one or more conditions, wherein each condition is associated with at least one weight. The machine-readable medium also comprises a second set of codes for causing a computer to detect whether an out-of-service event has occurred, and if an out-of-service event is detected, to identify selected conditions and associated weights, and process the associated weights to determine service acquisition "on" and "off" times.

In an aspect, at least one integrated circuit is provided that is configured for service acquisition. The at least one integrated circuit comprises a first module configured to determine one or more conditions, wherein each condition is associated with at least one weight. The at least one integrated circuit also comprises a second module configured to detect whether an out-of-service event has occurred, and if an out-of-service event is detected, to identify selected conditions and associated weights, and process the associated weights to determine service acquisition "on" and "off" times.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein:

FIG. 4 shows exemplary conditions for use in aspects of a service acquisition system;

FIG. 5 shows exemplary mode parameters for use in aspects of a service acquisition system;

DESCRIPTION

In various aspects, a service acquisition system is provided that operates to utilize one or more initial conditions to control how a wireless communication device attempts to acquire a usable signal to establish service with a serving system. For example, when an out-of-service state is detected, the wireless communication device attempts to acquire service during an "on" time, and conserves power during an "off" time. In an aspect, the service acquisition system operates to determine the service acquisition "on" time, "off" time, and/or acquisition frequency and duty cycle based on the initial conditions known by the wireless communication device when the attempt begins. Thus, the initial conditions are defined to include a wide range of conditions experienced by the wireless communication device known at the time of an OOS event, and these conditions are interpreted to determine how aggressively the wireless communication device should attempt to acquire service, which also impacts the power consumption of the wireless communication device.

The initial conditions are determined from a variety of sources and are used to choose between configurations of the "on" and "off" times, or to calculate the "on" and "off" times directly. This ratio could equivalently be expressed as the duration of the "on" or "off" times or the ratio of the "on" and "off" times and the length of the cycle defined by the sum of the "on" and "off" times. In an aspect, the "on" time may precede or follow, the "off" time. For example, the initial conditions may include the quality of the signal from the last system as measured by power and/or signal-to-noise ratio and may be combined with knowledge of one or more previous durations of out-of-service to determine the duration of the "on" and "off" times. Additionally, initial conditions related to the state of service usage, such as the amount of time the wireless communication device is in active communication, may be combined with the knowledge of nearby alternate service to estimate the duration of the "on" and "off" times for acquisition purposes. Knowledge of alternate service, and knowledge of geographic relationships of services, may be known to the wireless communication device based on information programmed into the device, information provided to the device by the communication network, and/or discovered by the wireless communication device during operation.

Figure 1:
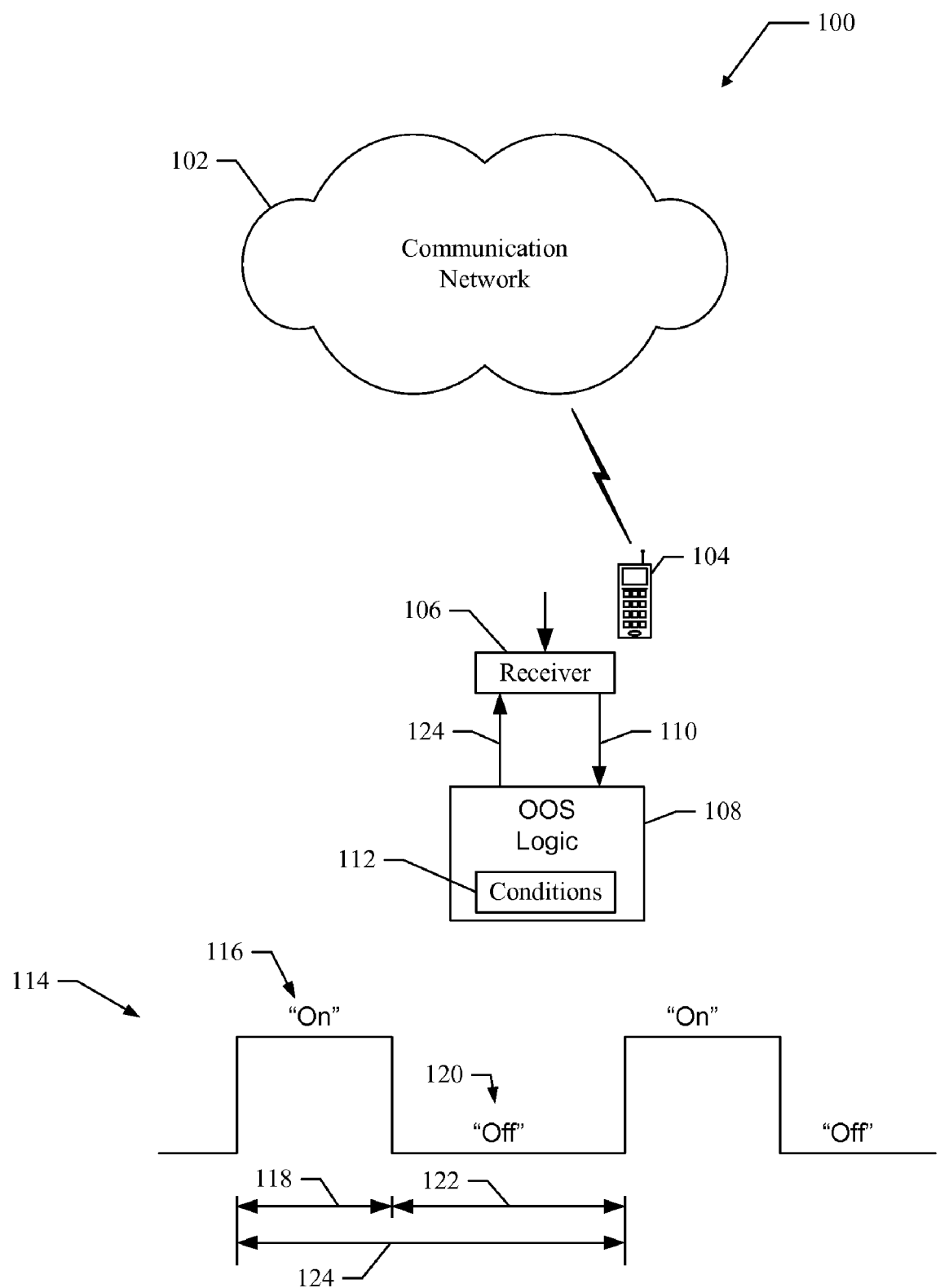
FIG. 1 shows a communication network that illustrates the operation of aspects of a service acquisition system.

In an aspect, the service acquisition system allows a determination of how aggressively a wireless communication device is to pursue service. For example, it may be desirable to pursue service more aggressively during times of more-active operation than during less-active operation. In less-active operation, the benefit of more "off" time to conserve power, particularly in a battery-powered wireless communication device, may be more important. The following is a partial list of initial conditions which may be utilized by aspects of the acquisition system to determine durations of the "on" and "off" times, and/or the service acquisition frequency and duty cycle.
1. Communication network complexity
2. Time of day
3. Historical usage patterns
4. Expected usage patterns
5. Expected likelihood of re-acquisition
6. Number of operating bands
7. Number of services for acquisition
8. Available power
9. Signal Quality of last system(s)
10. Previous out-of-service duration(s)
11. Duration of active time
12. Number of nearby wireless networks FIG. 1 shows a communication network that illustrates the operation of aspects of a service acquisition system. The communication network 100 comprises a communication network 102 and a wireless communication device 104. The communication network 102 may comprises any type of wireless and/or wired communication network and cover any desired geographic region. The communication network 102 may communicate with devices within the geographic region using any suitable type of communication technique or technology. Such knowledge of initial conditions may be transient and discarded after a period of time, or maintained persistently.

The wireless communication device 104 is operable to communicate with the communication network 102 and may be any type of cell phone, PDA, email device, pager, computer, or any other type of device that is able to communicate with the communication network 102 using the appropriate communication technology. For example, at power-up, the wireless communication device 102 is operable to establish service with the communication network 102 and maintain service as the wireless communication device 104 moves within the region covered by the communication network 102.

The wireless communication device 104 comprises a receiver 106 that operates to search for and acquire service with the communication network 102. For example, the receiver 106 is operable to tune to designated radio frequencies and receive transmissions from the communication network 102 on those frequencies. The receiver 106 is also able to transmit information on designated frequencies to the communication network 102. The operation of the receiver 106 to establish service with the communication network 102 requires the use of battery power. Thus, the longer the receiver 106 takes to search for and establish service with the communication network 102, the more battery power is utilized.

In an aspect, the receiver 106 provides information to out-of-service logic 108 as illustrated at 110. In an aspect, the out-of-service logic 108 operates to determine conditions 112 associated with the wireless communication device 104. Based on weights associated with the conditions 112, the out-of-service logic 108 operates to determine an acquisition "on" time, acquisition "off" time, and/or an acquisition frequency and duty cycle for the purpose of service acquisition. Thus, it is possible to assign any desired weighting to the conditions 112 to achieve a desired level of aggressiveness for service acquisition. By determining the aggressiveness for service acquisition, any desired balance (or trade-off relationship) between service acquisition and power consumption can be achieved.

A timing diagram 114 shows an acquisition "on" interval 116, which has a duration indicated at 118 and in which service acquisition is attempted. An acquisition "off" interval 120 is also shown, which has a duration indicated at 122 and in which service acquisition is not attempted to allow the wireless communication device 104 to conserve power. The sum of the "on" duration 118 and the "off" duration 120 represents an acquisition cycle time 124. It is also possible to determine an acquisition duty cycle as the ratio of the "on" duration 118 and the cycle time 124.

In various aspects, the out-of-service logic 108 operates to perform one or more of the following functions to determine the acquisition "on" time, acquisition "off" time, and/or an acquisition frequency and duty cycle.
1. Initialize and maintain conditions and associated weights at the wireless communication device 104.
2. Detect an out-of-service event.
3. Obtain the weights associated with some or all of the conditions.
4. Combine the weights to determine an aggressiveness indicator.
5. Process the aggressiveness indicator to determine service acquisition "on" and "off" times and/or acquisition frequency and duty cycle.

6. Provide the service acquisition "on" and "off" times and/or acquisition duty cycle to the receiver logic 106 for service acquisition.

Once the service acquisition "on" and "off" times and/or acquisition duty cycle is determined, the out-of-service logic 108 outputs this information to the receiver 106 as indicated at 124. The receiver 106 then attempts to acquire service using the determined acquisition "on" and "off" times and/or acquisition frequency and duty cycle.

Figure 2:
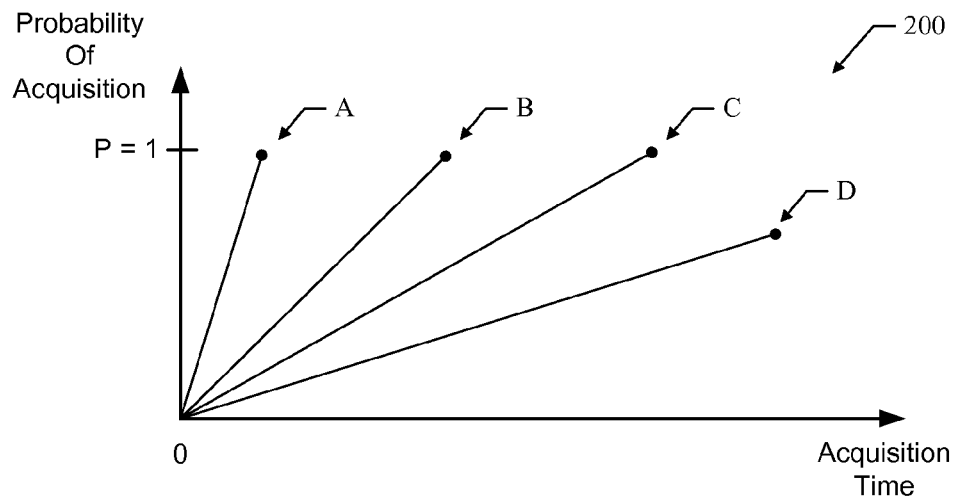
FIG. 2 shows a diagram that illustrates acquisition profiles for use in aspects of a service acquisition system.

Therefore, in various aspects, the acquisition system operates to initialize and maintain weighted conditions at a wireless communication device. When an out-of-service event is detected, weights associated with one or more of the conditions are processed to determine an aggressiveness indicator that determines how aggressively the wireless communication device should attempt to acquire service. Thus, the acquisition system operates to allow any desired balance or trade-off between acquisition aggressiveness and battery power utilization to be achieved FIG. 2 shows a diagram 200 that illustrates acquisition aggressiveness profiles for use in aspects of a service acquisition system. In an aspect, the aggressiveness profiles 200 are implemented by the out-of-service logic 108.

The aggressiveness profiles 200 are illustrated on a graph that shows the probability of service acquisition on the vertical axis and acquisition time on the horizontal axis. For example, four aggressiveness profiles (A, B, C, and D) are shown. Profile A illustrates a very aggressive profile having a relatively high probability of acquisition over a relatively short acquisition time. Profile D illustrates a less aggressive profile having a relatively low probability of acquisition over a relatively long acquisition time. Thus, while the more aggression profile A provides a high probability of service acquisition, its associated power utilization may be much higher than the less aggressive profile D. In various aspects, the service acquisition system operates to select an aggressiveness profile based on conditions that exist at the time an OOS event is detected so that a selected relationship between service acquisition and power consumption can be achieved.

Figure 3:
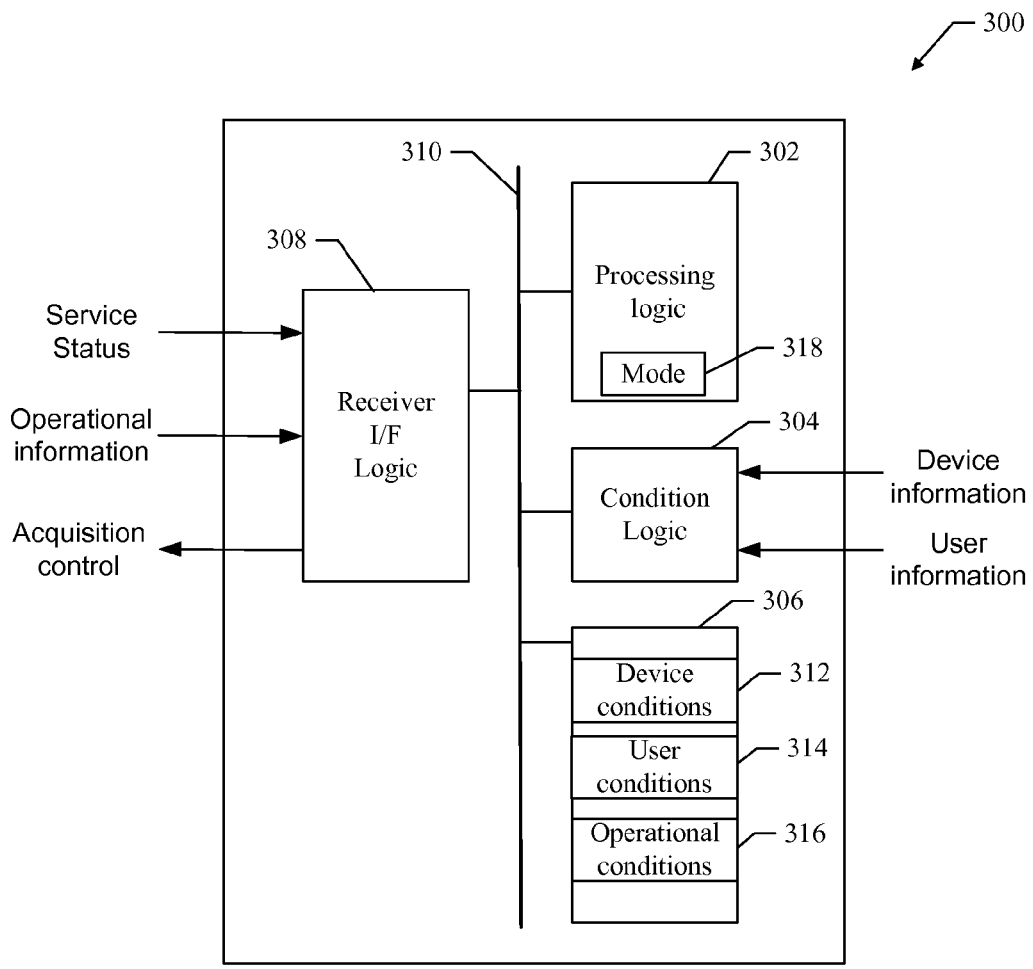
FIG. 3 shows exemplary out-of-service logic for use in aspects of a service acquisition system.

FIG. 3 shows exemplary out-of-service logic 300 for use in aspects of a service acquisition system. For example, the out-of-service logic 300 is suitable for use as the out-of-service logic 108 shown in FIG. 1. The out-of-service logic 300 comprises processing logic 302, condition logic 304, memory 306, and receiver interface (I/F) logic 308 all coupled to a data bus 310.

The receiver interface logic 308 comprises at least one of a CPU, processor, gate array, hardware logic, memory elements, and/or hardware executing software. The receiver interface logic 308 operates to receive service status indicators that indicate the current service status of a wireless communication device. For example the service status indicates whether the wireless communication device is currently in-service or out-of-service. For example, the service status information may be received from receiver logic of a wireless communication device, such as the receiver 106 shown in FIG. 1.

The receiver interface logic 308 also operates to receive operational information that describes various operational parameters associated with a wireless communication device. For example, the operational information describes what communication networks are available to the wireless communication device, the wireless communication device position, alternate service availability, and any other type of operational information. In an aspect, the operational information may be received from receiver logic of a wireless communication device, such as the receiver 106 shown in FIG. 1.

The receiver interface logic 308 also operates to transmit acquisition control information to a wireless communication device receiver. The acquisition control information comprises acquisition "on" and "off" times and/or acquisition frequency and duty cycle information. Such information can be utilized by the receiver logic to implement an aggressiveness profile whereby a selected balance (or trade-off) between service acquisition aggressiveness and wireless communication device power consumption is achieved. In an aspect, the acquisition control information is provided to the receiver interface logic 308 by the processing logic 302.

The condition logic 304 comprises at least one of a CPU, processor, gate array, hardware logic, memory elements, and/or hardware executing software. In an aspect, the condition logic 304 operates to determine a variety of conditions associated with a wireless communication device and store these conditions in the memory 306. The memory 306 comprises any suitable memory, such as RAM, EEPROM or any other type of volatile or non-volatile memory. For example, operational conditions 316 are determined from the operational information received by the receiver interface logic 308. The condition logic 304 also operates to receive wireless communication device information and uses this information to determine device conditions 314 that are also stored in the memory 306. Additionally, the condition logic 304 operates to receive user information and uses this information to determine user conditions 314 that are also stored in the memory 306. Each of the conditions has one or more associated weights that are also stored in the memory 306. The weights for each condition may be pre-stored at the out-of-service logic 300, determined by the processing logic 302, or downloaded from the communication network. In an aspect, the weights vary in magnitude and sign so that conditions to be weighted to provide more aggressive acquisition behavior are assigned increasingly larger positive numbers. Conversely, conditions to be weighted to provide less aggressive acquisition behavior to conserve power are assigned increasingly larger negative numbers. A more detailed description of the device conditions 312, user conditions 314, and operational conditions 316 is provided in other sections of this document.

The processing logic 302 comprises at least one of a CPU, processor, gate array, hardware logic, memory elements, and/or hardware executing software. In an aspect, the processing logic 302 operates to maintain mode parameters 318 that indicate acquisition modes for use by the out-of-service logic 300. In an aspect, the mode parameters 318 are determined by the processing logic 302 based on operational information received by the receiver interface logic 308. In an aspect, the mode parameters 318 are used to determine a set of conditions/weights which are to be evaluated for the purpose of determining acquisition control information.

The processing logic 302 operates to detect an out-of-service event. For example, the processing logic 302 receives the service status from the receiver interface logic 308 and uses this information to determine whether or not an out-of-service event has occurred. Once an out-of-service event is detected, the processing logic 302 utilizes the mode parameters 318 to determine which conditions/weights are to be evaluated for the purpose of determining acquisition control information.

The mode parameters 318 identify a list of conditions to be evaluated for one or more operating modes. The conditions in the list are selected from the conditions stored in the memory 306. Each of the identified conditions has one or more associated weights that the processing logic 302 obtains for processing. In an aspect, any combination of device conditions 312, user conditions 314 and operational conditions 316 may be selected based on lists associated with the mode parameters 318.

The processing logic 302 operates to determine an aggressiveness indicator by combining weights associated with the conditions selected by a particular mode parameter 318. In an aspect, the processing logic 302 determines the aggressiveness indicator (AI) using the following algorithm.

$$AI = \Sigma weight(i)$$

where the index i is determined from the list of conditions identified by the selected mode parameter 318. Thus, the aggressiveness indicator is determined by summing the weights associated with conditions identified by the selected mode parameter 318. It should be noted that any other type of processing of the selected conditions can be performed to determine the aggressiveness indicator.

Once the aggressiveness indicator is determined, the processing logic 302 operates to convert or map this indicator to acquisition "on" and "off" times. For example, the aggressiveness indicator may be mapped to a table of acquisition "on" and "off" times, or the aggressiveness indicator may be processed in any other way to determine the acquisition "on" and "off" times directly. For example, the aggressiveness indicator may be used to select a particular aggressiveness profile as illustrated in FIG. 2, from which acquisition "on" and "off" times can be determined. The processing logic 302 may also determine an acquisition frequency and duty cycle.

Once the acquisition "on" and "off" times and/or the acquisition frequency and duty cycle have been determined, the processing logic 302 passes this information to the receiver interface logic 308, which outputs the information as acquisition control information to a wireless communication device receiver. The receiver at the device then attempts to acquire service during the acquisition "on" times of the acquisition duty cycle. The receiver operates to conserve power during the acquisition "off" times.

In an aspect, the service acquisition system comprises a computer program product having one or more program instructions ("instructions") or sets of "codes" stored or embodied on a machine-readable medium, which when executed by at least one processor, for instance, a processor at the processing logic 302, operate to provide the functions described herein. For example, the sets of codes may be loaded into the out-of-service logic 300 from a machine-readable medium, such as a floppy disk, CDROM, memory card, FLASH memory device, RAM, ROM, or any other type of memory device or machine-readable medium that interfaces to the out-of-service logic 300. In another aspect, the sets of codes may be downloaded into the out-of-service logic 300 from an external device or communication network resource. The sets of codes, when executed, cause the out-of-service logic 300 to provide aspects of a service acquisition system as described herein.

FIG. 4 shows exemplary conditions 400 for use in aspects of a service acquisition system. For example, in an aspect, the conditions 400 are generated by the condition logic 304 shown in FIG. 3 and stored in the memory 306.

The conditions 400 comprise user conditions 402, device conditions 404 and operational conditions 406. Each condition comprises a condition index 408, a condition identifier 410, condition weight(s) 412 and a condition flag 414. In an aspect, the condition flag 414 is used to indicate that a particular condition is active or has been determined at a wireless communication device.

In an aspect, each condition is associated with one or more weights. Thus, for each condition the appropriate weight is selected based on a selected mode parameter. A more detailed description of weight selection in various aspects of the service acquisition system is provided below.

FIG. 5 shows exemplary mode parameters 500 for use in aspects of a service acquisition system. For example, in an aspect, the mode parameters 500 are maintained and processed by the processing logic 302.

The mode parameters 500 comprise a mode identifier 502, a mode context identifier 504, and condition lists 506. The context identifier 504 identifies a context that indicates when the particular condition list would be used to determine the aggressiveness indicator in response to an out-of-service event. For example, one context is a power up context that is associated with a list of conditions to be used to evaluate the aggressiveness indicator, and another context is designated as a default context that is associated with a list of conditions to be used to evaluate the aggressiveness indicator. Thus, any type of wireless communication device context can be defined that has an associated list of conditions to be evaluated.

Figure 6:
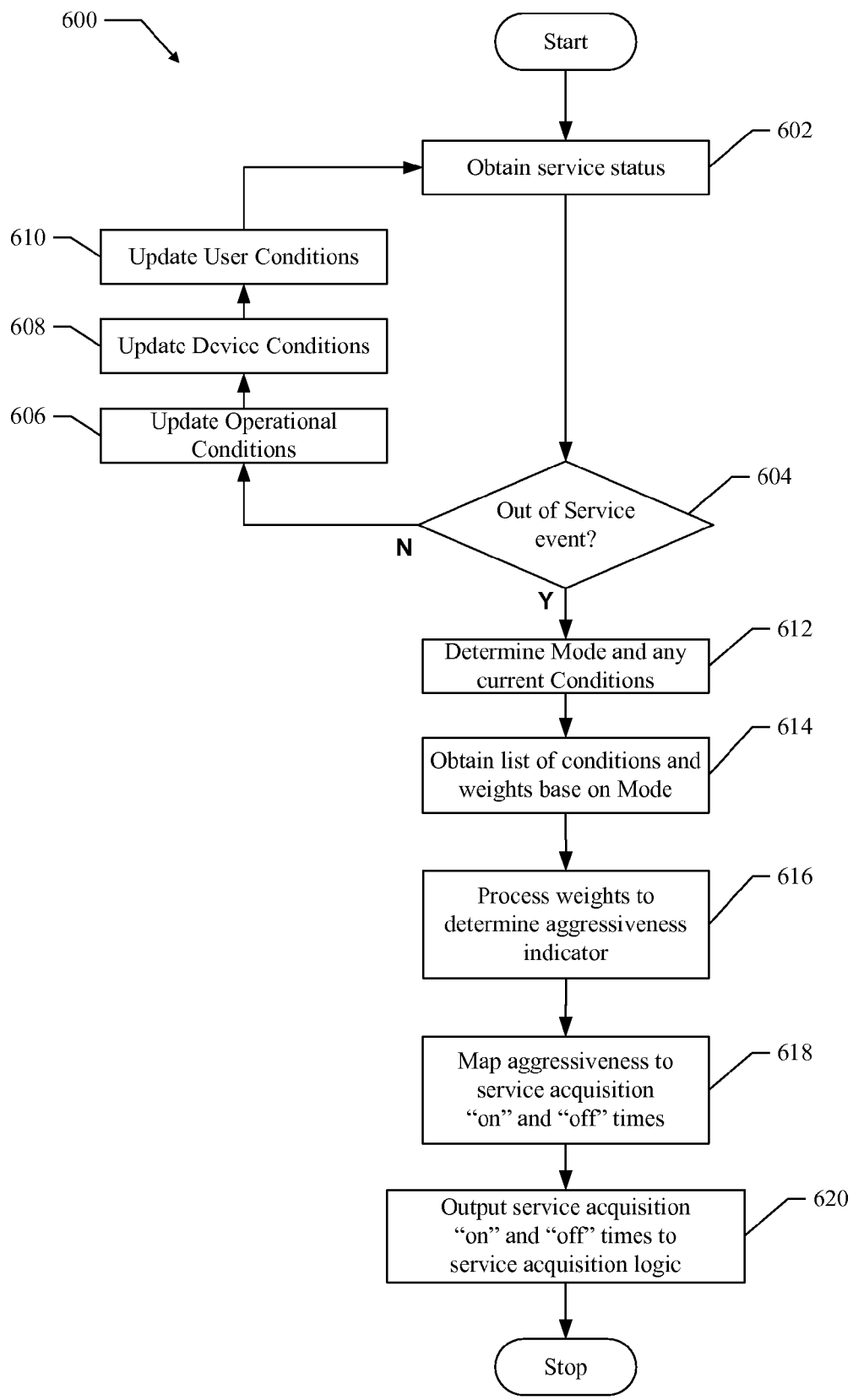
FIG. 6 shows an exemplary method for service acquisition provided by aspects of a service acquisition system.

FIG. 6 shows an exemplary method 600 for service acquisition provided by aspects of a service acquisition system. For clarity, the method 600 is described below with reference to the out-of-service logic 300 shown in FIG. 3. In an aspect, the processing logic 302 executes one or more sets of codes to control the out-of-service logic 300 to perform the functions described below.

At block 602, service status is obtained. In an aspect, the receiver interface logic 308 operates to receive service status and passes this information to the processing logic 302. The service status indicates whether or not service is currently established with a communication network.

At block 604, a determination is made as to whether an out-of-service event is detected. For example if the service status indicates that there is currently no service, the out-of-service event is detected. In an aspect, the processing logic 302 operates to make this determination. If an out-of-service event is not detected, the method proceeds to block 606 where operational, device, and user conditions are updated during an in-service time interval. If an out-of-service event is detected the method proceeds to block 612.

At block 606, operational conditions are updated. In an aspect, the condition logic 304 receives operational information from the receiver interface logic 308 and updates the operational conditions 316 stored in the memory 306. In an aspect, the operational conditions 316 are formatted as illustrated in FIG. 4. When an operational condition is updated or determined, the corresponding flag 414 is set to indicate that the condition currently exists at the device.

At block 608, device conditions are updated. In an aspect, the condition logic 304 receives wireless communication device information and updates the device conditions 312 stored in the memory 306. In an aspect, the device conditions 312 are formatted as illustrated in FIG. 4. When a device condition is updated or determined, the corresponding flag 414 is set to indicate that the condition currently exists at the device.

At block 610, user conditions are updated. In an aspect, the condition logic 304 receives user information and updates the user conditions 314 stored in the memory 306. In an aspect, the user conditions 314 are formatted as illustrated in FIG. 4. When a user condition is updated or determined, the corresponding flag 414 is set to indicate that the condition currently exists at the device.

At block 612, a mode and any current conditions are determined. In an aspect, the processing logic 302 operates to determine the current mode from the mode parameters 318. The mode indicates a context that is associated with how an aggressiveness indicator is to be determined. In an aspect, the mode parameters 318 are formatted as illustrated in FIG. 5. In an aspect, the condition logic 304 operates to determine any current conditions that are determined or updated at the time the out-of-service event is detected. For example, the condition logic 304 operates to determine a time-in-service condition and/or a battery life condition that describes how long the device has been in-service and remaining battery life, respectively. In an aspect, the current conditions are part of the operational, device, and user conditions, however, they are updated at the time the out-of-service event is detected so that the most up to date information can be used to determine the aggressiveness with which the device attempts to acquire service.

At block 614, in response to the detection of an out-of-service event, a list of conditions and associated weights are determined based on the current mode. In an aspect, the processing logic 302 uses the current mode to determine a list of conditions that are to be used to determine an aggressiveness indicator. For example, the mode indicates a current device context, (i.e., mode 1 indicates "power up") and the processing logic 302 operates to obtain the list of conditions associated with the mode that are to be processed to determine the aggressiveness indicator. The processing logic 302 then obtains weights associated with the list of conditions. In an aspect, the processing logic 302 checks to make sure that a flag associated with each condition is set to indicate that the condition currently exists at the device. If a corresponding flag is not set for a particular condition, the processing logic 302 may omit that condition from its aggressiveness determination.

In an aspect, each condition is associated with one weight and the processing logic 302 operates to obtain these weights to determine the aggressiveness indicator. In another aspect, each condition is associated with multiple weights and these weights are indexed by mode. For example, a condition may be associated with a first weight to be used for mode 1, a second weight to be used for mode 2, and so on. In this way the weights associated with each condition can be selected based on the mode parameter to allow additional control over the determination of service acquisition aggressiveness.

At block 616, the weights associated with the list of conditions are processed to determine an aggressiveness indicator. In an aspect, the processing logic 302 operates to process the weights according to the algorithm described above to determine the aggressiveness indicator (AI).

At block 618, the aggressiveness indicator is mapped to service acquisition "on" and "off" times. In an aspect, the processing logic 302 operates to map the aggressiveness indicator to a table that provides the service acquisition "on" and "off" times. In another aspect, the aggressiveness indicator is processed according to any suitable algorithm to determine the service acquisition "on" and "off" times directly. For example, the aggressiveness indicator may be mapped to aggressiveness profiles as illustrated in FIG. 2 and those profiles may be mapped or correspond to selected service acquisition "on" and "off" times.

At block 620, the service acquisition "on" and "off" times are output to service acquisition logic at the device. For example, the processing logic 302 provides the service acquisition "on" and "off" times to the receiver interface logic 308 which in turn, outputs the service acquisition "on" and "off" times as acquisition control parameters to receiver logic at the device. The receiver logic at the device is then able to attempt to establish service using the service acquisition "on" and "off" times so that a selected aggressiveness profile can be achieved.

Therefore, the method 600 operates to allow a wireless communication device to achieve a selected aggressiveness profile during service acquisition. It should be noted that the method 600 is just one implementation and that the operations of the method 600 may be rearranged or otherwise modified within the scope of the various aspects. Thus, other implementations are possible with the scope of the various aspects described herein.

Figure 7:
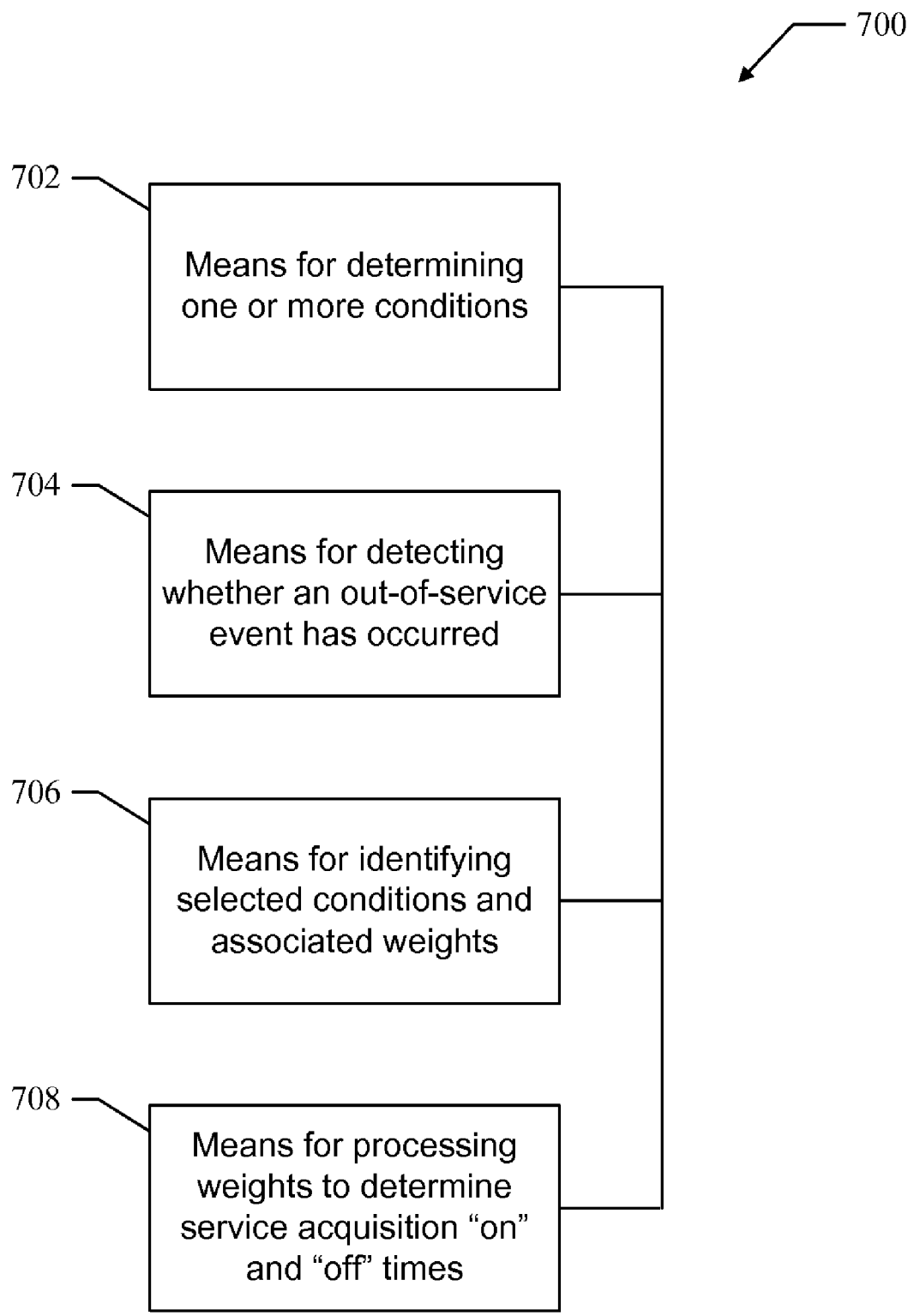
FIG. 7 shows exemplary out-of-service logic for use in aspects of a service acquisition system.

FIG. 7 shows exemplary out-of-service logic 700 for use in aspects of a service acquisition system. For example, the out-of-service logic 700 is suitable for use as the out-of-service logic 108 shown in FIG. 1. In an aspect, the out-of-service logic 700 is implemented by at least one integrated circuit comprising one or more modules configured to provide aspects of an acquisition system as described herein. For example, in an aspect, each module comprises hardware and/or hardware executing software.

The out-of-service logic 700 comprises a first module comprising means (702) for determining one or more conditions, wherein each condition is associated with at least one weight, which in an aspect comprises the condition logic 304. The out-of-service logic 700 also comprises a second module comprising means (704) for detecting whether an out-of-service event has occurred, which in an aspect comprises the processing logic 302. The out-of-service logic 700 also comprises a third module comprising means (706) for identifying selected conditions and associated weights, if an out-of-service event is detected, which in an aspect comprises the processing logic 302. The out-of-service logic 700 also comprises a fourth module comprising means (708) for processing the associated weights to determine service acquisition "on" and "off" times, if an out-of-service event is detected, which in an aspect comprises the processing logic 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a service acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for service acquisition, the method comprising:
   determining one or more conditions, wherein each condition is associated with at least one weight;
   detecting whether an out-of-service event has occurred; and
   if an out-of-service event is detected:
      identifying selected conditions and associated weights; and
      processing the associated weights to determine service acquisition "on" and "off" times.

2. The method of claim 1, further comprising attempting to acquire service using the service acquisition "on" and "off" times.

3. The method of claim 1, wherein said identifying comprises identifying the selected conditions and the associated weights based on a mode parameter.

4. The method of claim 3, wherein said processing comprises:
   processing the associated weights to determine an aggressiveness indicator; and
   mapping the aggressiveness indicator to determine the service acquisition "on" and "off" times.

5. The method of claim 3, wherein said processing comprises summing the associated weights to determine the aggressiveness indicator.

6. The method of claim 1, wherein said determining comprises determining the one or more conditions to comprise at least one of a user condition, a device condition, and an operational condition.

7. The method of claim 1, wherein said identifying comprises determining the selected conditions to include current conditions comprising at least one of a time-in-service condition and a battery life condition that are determined after the out-of-service event is detected.

8. The method of claim 1, wherein said determining comprises updating the one or more conditions during in-service time intervals.

9. The method of claim 1, wherein said determining comprises initializing the one or more conditions and one or more associated weights.

10. An apparatus for service acquisition, the apparatus comprising:
    condition logic configured to determine one or more conditions, wherein each condition is associated with at least one weight; and
    processing logic configured to detect whether an out-of-service event has occurred, and if an out-of-service event is detected, to identify selected conditions and associated weights, and process the associated weights to determine service acquisition "on" and "off" times.

11. The apparatus of claim 10, further comprising interface logic configured to attempt to acquire service using the service acquisition "on" and "off" times.

12. The apparatus of claim 10, wherein said processing logic is configured to identify the selected conditions and the associated weights based on a mode parameter.

13. The apparatus of claim 12, wherein said processing logic is configured to:
    process the associated weights to determine an aggressiveness indicator; and
    map the aggressiveness indicator to determine the service acquisition "on" and "off" times.

14. The apparatus of claim 12, wherein said processing logic is configured to sum the associated weights to determine the aggressiveness indicator.

15. The apparatus of claim 10, wherein said condition logic is configured to determine the one or more conditions to comprise at least one of a user condition, a device condition, and an operational condition.

16. The apparatus of claim 10, wherein said condition logic is configured to determine the selected conditions to include current conditions comprising at least one of a time-in-service condition and a battery life condition that are determined after the out-of-service event is detected.

17. The apparatus of claim 10, wherein said condition logic is configured to update the one or more conditions during in-service time intervals.

18. The apparatus of claim 10, wherein said condition logic is configured to initialize the one or more conditions and their associated weights.

19. An apparatus for service acquisition, the apparatus comprising:
    means for determining one or more conditions, wherein each condition is associated with at least one weight;
    means for detecting whether an out-of-service event has occurred; and
    if an out-of-service event is detected:
       means for identifying selected conditions and associated weights; and
       means for processing the associated weights to determine service acquisition "on" and "off" times.

20. The apparatus of claim 19, further comprising means for attempting to acquire service using the service acquisition "on" and "off" times.

21. The apparatus of claim 19, wherein said means for identifying comprises means for identifying the selected conditions and the associated weights based on a mode parameter.

22. The apparatus of claim 21, wherein said means for processing comprises:
    means for processing the associated weights to determine an aggressiveness indicator; and
    means for mapping the aggressiveness indicator to determine the service acquisition "on" and "off" times.

23. The apparatus of claim 21, wherein said means for processing comprises means for summing the associated weights to determine the aggressiveness indicator.

24. The apparatus of claim 19, wherein said means for determining comprises means for determining the one or more conditions to comprise at least one of a user condition, a device condition, and an operational condition.

25. The apparatus of claim 19, wherein said means for determining comprises means for determining the selected conditions to include current conditions comprising at least one of a time-in-service condition and a battery life condition that are determined after the out-of-service event is detected.

26. The apparatus of claim 19, wherein said means for determining comprises means for updating the one or more conditions during in-service time intervals.

27. The apparatus of claim 19, wherein said means for determining comprises means for initializing the one or more conditions and one or more associated weights.

28. A computer program product for service acquisition, the computer program product comprising:
a non-transitory machine-readable medium encoded with a computer program executable by a processor comprising:
a first set of codes for causing a computer to determine one or more conditions, wherein each condition is associated with at least one weight; and
a second set of codes for causing the computer to detect whether an out-of-service event has occurred, and if an out-of-service event is detected, to identify selected conditions and associated weights, and process the associated weights to determine service acquisition "on" and "off" times.

29. The non-transitory machine-readable medium of claim 28, further comprising a third set of codes for causing the computer to attempt to acquire service using the service acquisition "on" and "off" times.

30. The non-transitory machine-readable medium of claim 28, wherein said second set of codes are configured to cause the computer to identify the selected conditions and the associated weights based on a mode parameter.

31. The non-transitory machine-readable medium of claim 30, wherein said second set of codes are configured to cause the computer to:
process the associated weights to determine an aggressiveness indicator; and
map the aggressiveness indicator to determine the service acquisition "on" and "off" times.

32. The non-transitory machine-readable medium of claim 30, wherein said second set of codes are configured to cause the computer to sum the associated weights to determine the aggressiveness indicator.

33. The non-transitory machine-readable medium of claim 28, wherein said first set of codes are configured to cause the computer to determine the one or more conditions to comprise at least one of a user condition, a device condition, and an operational condition.

34. The non-transitory machine-readable medium of claim 28, wherein said first set of codes are configured to cause the computer to determine the selected conditions to include current conditions comprising at least one of a time-in-service condition and a battery life condition that are determined after the out-of-service event is detected.

35. The non-transitory machine-readable medium of claim 28, wherein said first set of codes are configured to cause the computer to update the one or more conditions during in-service time intervals.

36. The non-transitory machine-readable medium of claim 28, wherein said first set of codes are configured to cause the computer to initialize the one or more conditions and their associated weights.

37. At least one integrated circuit configured for service acquisition, the at least one integrated circuit comprising:
a first module configured to determine one or more conditions, wherein each condition is associated with at least one weight; and
a second module configured to detect whether an out-of-service event has occurred, and if an out-of-service event is detected, to identify selected conditions and associated weights, and process the associated weights to determine service acquisition "on" and "off" times.

38. The at least one integrated circuit of claim 37, further comprising a third module configured to attempt to acquire service using the service acquisition "on" and "off" times.

39. The at least one integrated circuit of claim 37, wherein said second module is configured to identify the selected conditions and the associated weights based on a mode parameter.

40. The at least one integrated circuit of claim 39, wherein said second module is configured to:
process the associated weights to determine an aggressiveness indicator; and
map the aggressiveness indicator to determine the service acquisition "on" and "off" times.

41. The at least one integrated circuit of claim 39, wherein said second module is configured to sum the associated weights to determine the aggressiveness indicator.

42. The at least one integrated circuit of claim 37, wherein said first module is configured to determine the one or more conditions to comprise at least one of a user condition, a device condition, and an operational condition.

43. The at least one integrated circuit of claim 37, first module is configured to determine the selected conditions to include current conditions comprising at least one of a time-in-service condition and a battery life condition that are determined after the out-of-service event is detected.

44. The at least one integrated circuit of claim 37, wherein said first module is configured to update the one or more conditions during in-service time intervals.

45. The at least one integrated circuit of claim 37, wherein said first module is configured to initialize the one or more conditions and their associated weights.

* * * * *